(12) United States Patent
Yoshioka et al.

(10) Patent No.: US 6,499,520 B1
(45) Date of Patent: Dec. 31, 2002

(54) PNEUMATIC TIRE WITH WIDE CENTRAL GROOVE

(75) Inventors: Tetsuhiko Yoshioka, Kobe (JP); Yoshiki Nakagawa, Nishinomiya (JP)

(73) Assignee: Sumitomo Rubber Industries, Ltd., Hyogo-ken (JP)

( * ) Notice: Subject to any disclaimer, the term of this patent is extended or adjusted under 35 U.S.C. 154(b) by 0 days.

(21) Appl. No.: 09/637,079

(22) Filed: Aug. 11, 2000

(30) Foreign Application Priority Data

Aug. 11, 1999 (JP) .......................................... 11-227952

(51) Int. Cl.$^7$ ....................... B60C 11/04; B60C 101/00; B60C 103/00
(52) U.S. Cl. ............................. 152/209.26; 152/209.28
(58) Field of Search ........................ 152/209.26, 209.28

(56) References Cited

U.S. PATENT DOCUMENTS

| | | | | |
|---|---|---|---|---|
| 5,176,766 | A | * | 1/1993 | Landers et al. |
| 5,291,929 | A | * | 3/1994 | Daisho et al. |
| 5,370,168 | A | * | 12/1994 | Boiocchi et al. |
| 5,375,639 | A | * | 12/1994 | Suzuki et al. |
| 5,421,391 | A | * | 6/1995 | Himuro |
| 5,472,030 | A | * | 12/1995 | Shibata et al. |
| 6,302,174 | B1 | * | 10/2001 | Suzuki |

FOREIGN PATENT DOCUMENTS

| EP | 0 715 973 A | | 6/1996 |
|---|---|---|---|
| EP | 916523 | * | 5/1999 |
| EP | 950547 | * | 10/1999 |
| JP | 3-139402 | * | 6/1991 |
| JP | 6-143932 | * | 5/1994 |
| JP | 714682 | | 2/1995 |
| JP | 9-300917 | * | 11/1997 |

OTHER PUBLICATIONS

Patent Abstract of Japan—No. 08142609; Jun. 4, 1996; for "Pneumatic Tire" By I. Takashi.

Patent Abstract of Japan—No. 09156320; Jun. 17, 1997; for "Pneumatic Tire" By S. Toshihiko.

* cited by examiner

Primary Examiner—Steven D. Maki
(74) Attorney, Agent, or Firm—Birch, Stewart, Kolasch & Birch, LLP

(57) ABSTRACT

A pneumatic tire has a circumferentially continuously extending wide groove having a width of from 35 to 45 mm disposed in a tread center. A part on each side of the wide groove, which is defined as extending at least 10 mm axially outwards from the groove edge, forms a substantially continuous rib part. A part between the rib part and a tread edge has circumferentially discontinuous grooves so that: an axially inner part has a land ratio La of not less than 90%; a middle part has a land ratio of Lb in a range of from 80 to 90%; and an axially outer part has a land ratio Lc in a range of from 85 to 95%, wherein the axially inner part, middle part and axially outer part are three equiwidth parts between the wide groove and the tread edge.

11 Claims, 4 Drawing Sheets

PNEUMATIC TIRE WITH WIDE CENTRAL GROOVE

BACKGROUND OF THE INVENTION

1. Field of the Invention

The present invention relates to a pneumatic tire with a wide central groove, more particularly to a tread pattern having a specific land ratio arrangement being capable of improving wet performance and steering stability.

2. Description of the Related Art

In the laid-open Japanese patent application Nos. JP-A-6-143932, JP-A-6-143937 and JP-A-6-191227, pneumatic tires with a wide central groove are disclosed, wherein the wide central groove has a width in the range of from 35 to 45 mm and extends on the tire equator continuously in the tire circumferential direction.

In such a tire, when additional grooves are provided, the steering stability is liable to deteriorate because the tread rigidity is already decreased by the wide central groove considerably. From this point of view, it is preferable to decrease the additional grooves. However, if such grooves are decreased, wet performance, especially antiaquaplaning performance greatly decreases.

Therefore, the present inventors studied tread pattern to obtain maximum effect from minimum additional grooves, and found that the steering stability and wet performance become compatible with each other by specifically limiting the distribution of land ratio.

SUMMARY OF THE INVENTION

It is therefore, an object of the present invention to provide a pneumatic tire with a wide central groove, in which both the steering stability and wet performance are improved.

According to the present invention, a pneumatic tire comprises a circumferentially continuously extending wide groove having a width of from 35 to 45 mm disposed in a tread center, a tread part on each side of the wide groove, which is defined as extending at least 10 mm axially outwards from the groove edge, being formed as a substantially continuous rib part, a tread part between the rib part and a tread edge, being provided with circumferentially discontinuous grooves so that: an axially inner part has a land ratio La of not less than 90%; a middle part has a land ratio Lb in a range of from 80 to 90%; and an axially outer part has a land ratio Lc in a range of from 85 to 95%, wherein the axially inner part, middle part and axially outer part are three equiwidth parts between the wide groove and the tread edge.

BRIEF DESCRIPTION OF THE DRAWINGS

An embodiment of the present invention will now be described in detail in conjunction with the accompanying drawings.

DETAILED DESCRIPTION OF THE INVENTION

Figure 1:
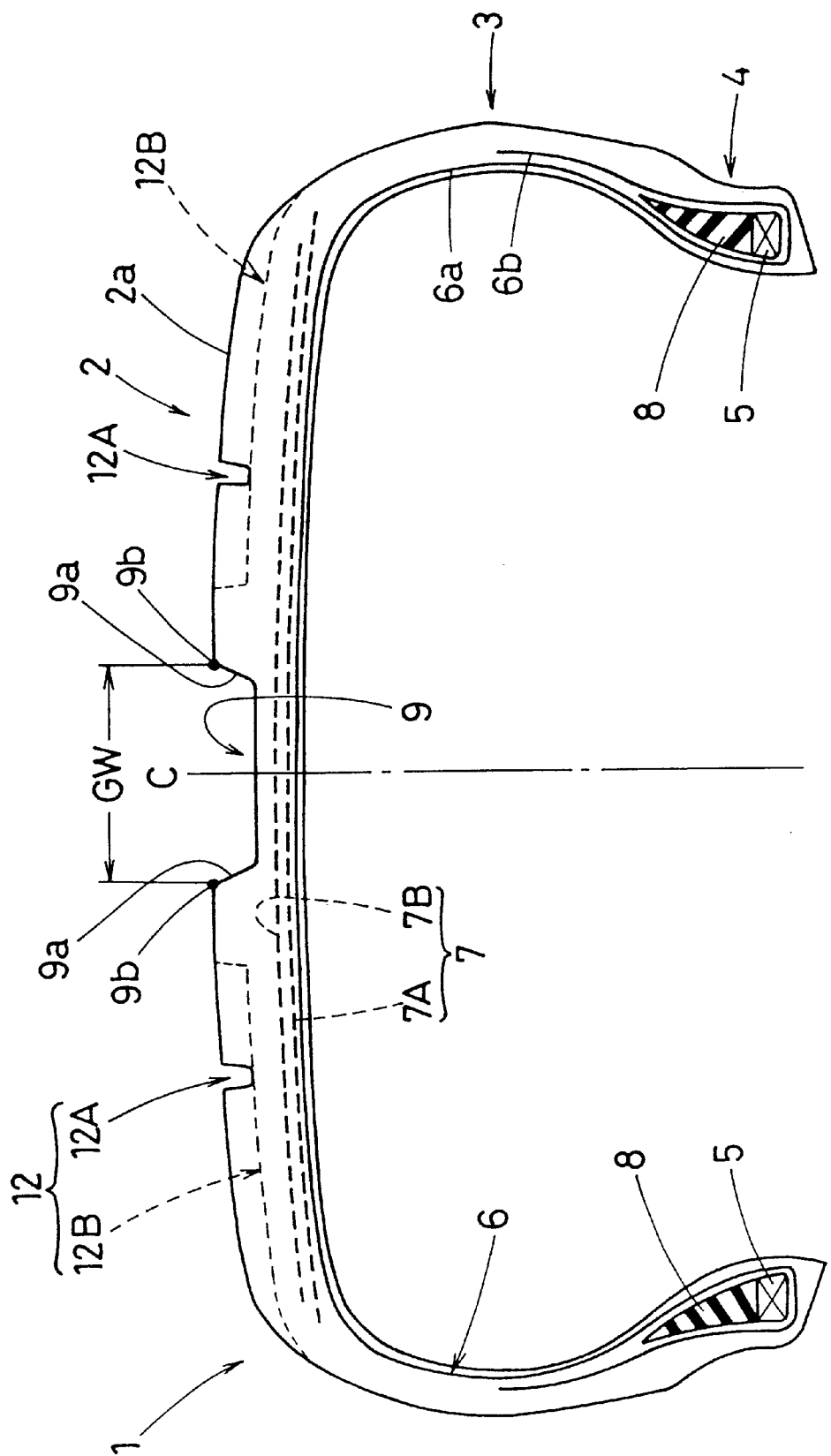
FIG. 1 is a cross sectional view of a pneumatic tire according to the present invention.

In the drawings, pneumatic tire 1 according to the invention comprises a tread portion 2, a pair of sidewall portions 3, a pair of bead portions 4 each with a bead core 5 therein, a carcass 6 extending between the bead portions 4, a belt 7 disposed radially outside the carcass 6 in the tread portion 2. In this embodiment, the tire 1 is a radial tire for passenger cars.

The carcass 6 comprise at least one ply of cords arranged radially at an angle of from 75 to 90 degrees with respect to the tire equator C. For the carcass cords, organic fiber cords, e.g. nylon, rayon, polyester and the like are used in case of passenger car tires. But, it is also possible to use steel cords according to the requirements and/or type and use of the tire.

In each of the bead portions 4, a bead apex 8 is disposed between the main portion 6a and turned up portion 6b of the carcass 6. The bead apex 8 is made of hard rubber extend radially outwardly from the bead core 5.

The belt 7 comprises a breaker and optionally a band (not shown in this example).

The breaker 7 comprises at least two cross plies 7A and 7B of steel cords laid at a small angle of from 10 to 45 degrees with respect to the tire equator.

The band is disposed radially outside the belt layer 7 and made of parallel cords or spiral windings of at least one cord, wherein the cords or windings are laid at a small angle or substantially parallel to the tire circumferential direction. For the band cords, organic fiber cords, e.g. nylon, aramid and the like can be used.

According to the present invention, a wide groove 9 having a width GW in the range of from 35 to 45 mm is disposed in the center of the tread portion 2. The wide groove 9 extends continuously in the tire circumferential direction. Preferably, the depth thereof is set in the range of from 0.1 to 0.3 times the width GW. The wide groove 9 is centered on the tire equator C in this example, but it is also possible to somewhat set off the tire equator C. The wide groove 9 is the only groove which extends continuously in the tire circumferential direction.

If the width GW is less than 35 mm, air tube resonance is liable to occur in the wide groove in the ground contacting patch and a running noise (air tube resonance noise) increases. if the width GW exceeds 45 mm, it is difficult to maintain even a minimal steering stability.

In this embodiment, both the edges 9b of the wide groove 9 are straight. But, it is also possible to make the edges 9b zigzag or wavy as far as the amplitude thereof is not so large, for example, the amplitude does not exceed the undermentioned width W.

Here, the groove width is measured between the groove edges under a normally inflated unloaded condition in which the tire is mounted on a standard rim, and inflated to a standard pressure but loaded with no tire load. Usually, the groove edge is an intersection of the groove wall and tread surface. But, if the corner therebetween is rounded, it may be defined as an intersection of extensions of the groove wall and tread surface. The standard rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at Various Cold Inflation Pressures" table in TRA or the like. The standard load is the "maximum load capacity" in JATMA, the "Load Capacity" in ETRTO, the maximum value given in the above-mentioned table in TRA or the like. Further, the undermentioned tread edges E are defined as the axial outermost edges E of the ground contacting region under such a condition that the tire is mounted on the standard rim and inflated to the standard pressure, and then loaded with the standard load. In case of passenger car tires, however, 200 kPa is used as the standard pressure, and the standard load determined as above is reduced to 88%.

A part on each side of the wide groove 9 is not provided with a groove having a positive width. This part is defined as extending axially outwards from the edge 9b of the wide groove 9 and having an axial width W in the range of at least 10 mm, preferably 10 to 25 mm, more preferably 15 to 25 mm. The "positive width" is such a width that the groove walls do not contact with each other in the ground contacting patch. In case of sipe or cut having a width less than 1 mm, the groove walls contact with each other in the ground contacting patch. Therefore, sipes can be disposed in this part. This part accordingly forms a rib part 10 which is substantially continuous in the tire circumferential direction.

In general, a very wide groove is not preferable for steering stability. In the present invention, however, steering stability such as handle response during cornering, stability during straight running and the like can be improved by the rib part 10 on each side of the wide groove 9. If the width W of the rib part 10 is less than 10 mm, the steering stability can not be improved. If the width W exceeds 25 mm, the heat radiation tends to decrease, which is not preferable for the high-speed durability.

Figure 2:
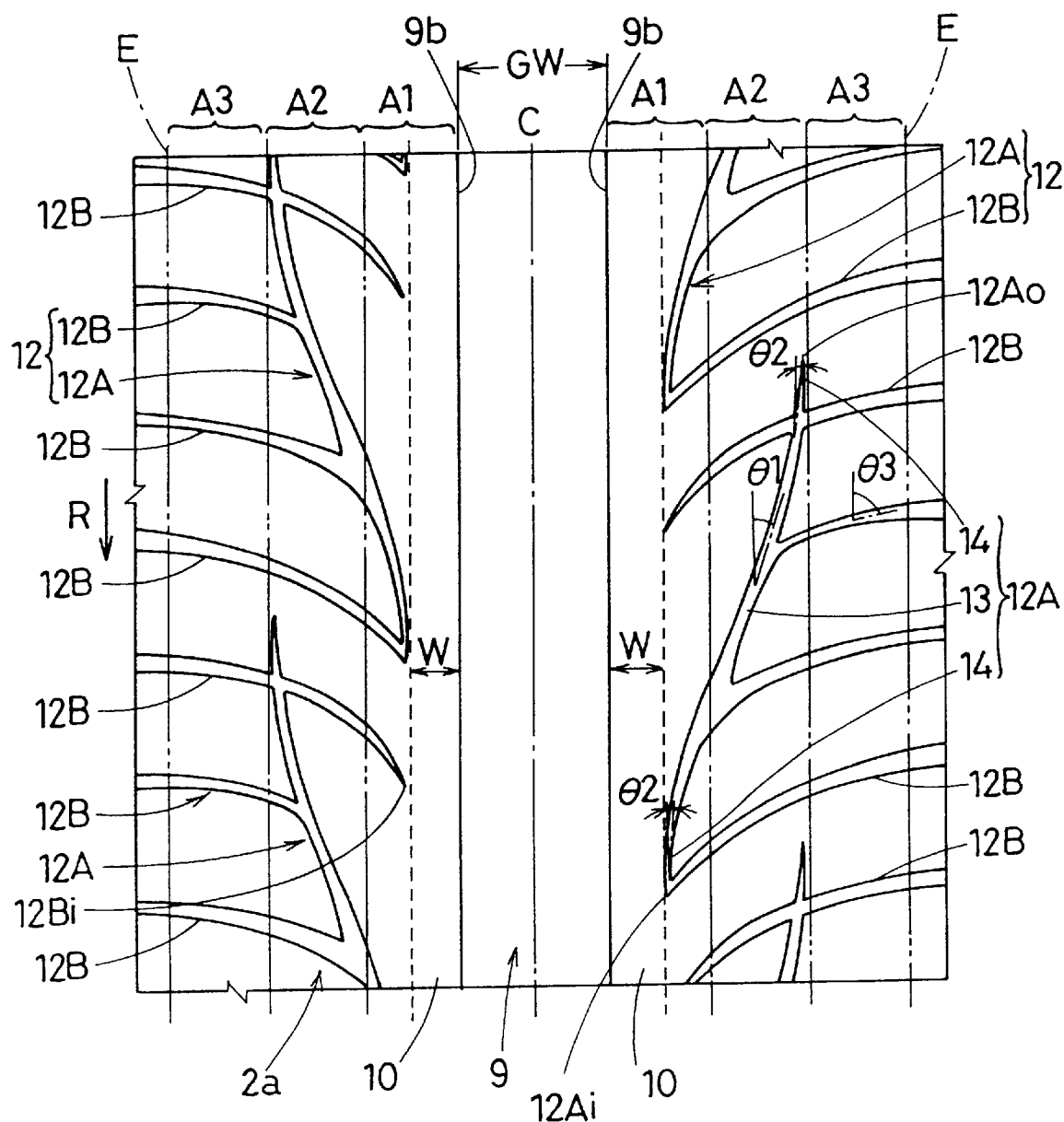
FIG. 2 is a developed plan view thereof showing an example of the tread pattern.
Figure 3:
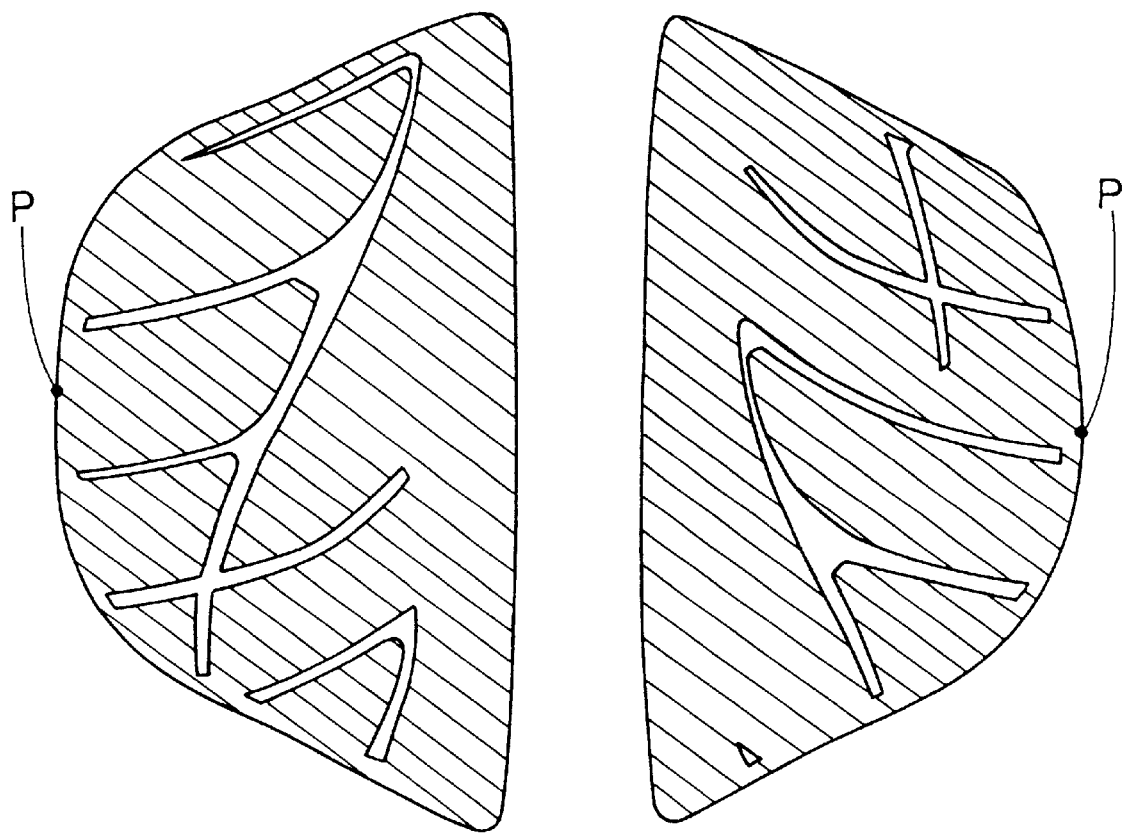
FIG. 3 is a foot print thereof.

According to the present invention, as shown in FIG. 2, a part between the wide groove 9 and each of the tread edges E is provided with grooves having positive width so that an axially inner part A1, middle part A2 and axially outer part A3 have specific land ratios La, Lb and Lc, respectively. Here, the inner part A1, middle part A2 and outer part A3 are defined as three equiwidth parts between the edge 9b of the wide groove 9 and the tread edge E. In case of zigzag or wavy edge, a straight line drawn along the center of the amplitude is used instead of the actual groove edge in defining these parts A1–A3. The land ratio La, Lb, Lc of each part A1, A2 A3 is defined as the percentage of the land area to the total area of the part. The land area is the total ground contacting area of the part around the tire.

The land ratio La of the inner part A1 is set in the range of not less than 90%, preferably not less than 92%, more preferably not less. than 95%.

The land ratio Lb of the middle part A2 is set in the range of from 80 to 90%.

The land ratio Lc of the outer part A3 is set in the range from 85 to 95%.

The land ratios La and Lc are set to be more than the land ratio Lb. Thus, (La=Lc>Lb) or (La>Lc>Lb) or (Lc>La>Lb).

By these limitations, the axially inner and outer parts A1 and A3 have relatively higher rigidity than the middle part A2 to thereby generate a relatively large side force. Thus, this limitation is important to the steering stability during cornering. Further, these are effective in heat radiation. The middle part A2 has a tendency to generate a relatively large amount of heat during running. But, as the middle part A2 has a relatively large grooved area, heat radiation is promoted, and the high-speed durability can be improved.

By setting the land ratios La, Lb and Lc to satisfy the following relationship: La>Lc>Lb, a shortage of rigidity in the tread central region due to the wide groove 9 can be supplemented.

To realize the above-mentioned land ratios La, Lb and Lc, the tread portion 2 in this embodiment is provided with a plurality of groove sets 12, each set 12 comprising a less-inclined oblique groove 12A inclined at an angle of not more than 30 degrees with respect to the circumferential direction of the tire, and more-inclined oblique grooves 12B inclined at an angle of more than 30 degrees with respect to the circumferential direction.

Each oblique groove 12A, 12B has a relatively narrow width of from 2 to 5 mm.

The less-inclined oblique grooves 12A are mainly disposed in the middle parts A2. As the less-inclined oblique groove 12A is inclined, it has an axially inner end 12Ai and an axially outer end 12Ao. The inner end 12Ai is spaced apart from the edge 9b of the wide groove 9 by a certain axial distance which is at least the above-mentioned width W. The outer end 12Ao is positioned axially inside the tread edge E, in this example on the border between the middle part A2 and outer part A3.

Figure 4:
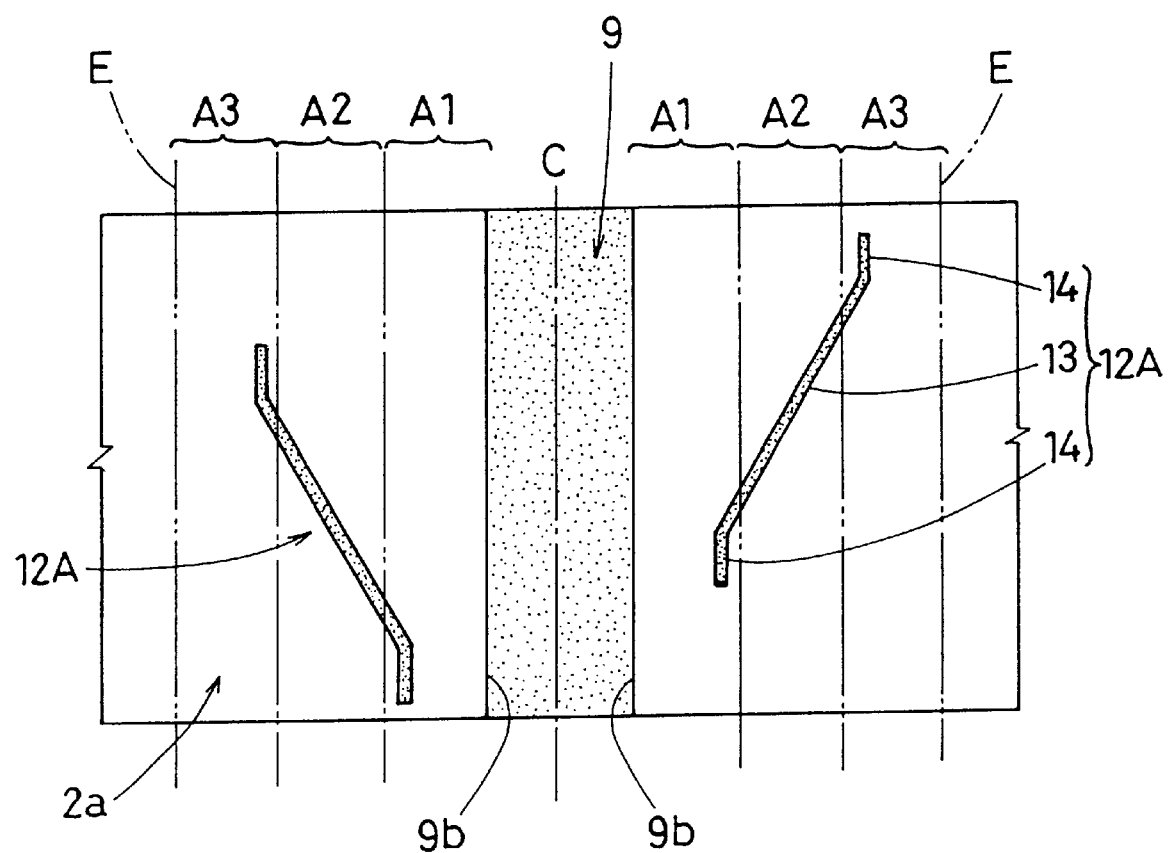
FIG. 4 is a diagram for explaining the oblique groove.

In this embodiment, both end portions 14 of the less-inclined oblique groove 12A are substantially straight and parallel with the circumferential direction. The inclination angle $\theta 2$ of the end portion 14 is set in the range of less than 10 degrees with respect to the circumferential direction. The middle portion 13 between the end portions 14 is inclined at an angle $\theta 1$ of from 10 to 30 degrees with respect to the circumferential direction. The circumferential length of the middle portion 13 is more than that of the end portion 14. One of the end portions 14 is disposed in the axially inner part A1, and the other end portion 14 is disposed near the axially outer part A3 as shown in FIG. 2 or within the axially outer part A3 as shown in FIG. 4.

It is effective in removing water from the tread to concentrate the less-inclined grooves in the middle part A2 as above. Thus, the occurrence of aquaplaning phenomenon can be controlled even in a high speed range, and the wet performance can be improved.

In each groove set 12, the number of the more-inclined oblique grooves 12B is at least three, and it is preferable that all the more-inclined oblique grooves 12B join the less-inclined oblique grooves 12A.

Each of the more-inclined oblique grooves 12B has an axially inner end 12Bi spaced apart from the edge 9b of the wide groove 9 by a certain axial distance which is at least the above-mentioned width W. And the groove 12B extends beyond the tread edge E. Preferably, the more-inclined oblique grooves 12B are inclined at an angle of more than 40 degrees.

In FIG. 2, the number of the more-inclined oblique grooves 12B is four, wherein the first to the third (counted from the axially inner end 12Ai to the axially outer end 12Ao) start from the less-inclined oblique groove 12A and extend beyond the tread edge E. But, the fourth groove starts from a position axially same as the axially inner end 12Ai and extend beyond the tread edge E, intersecting the less-inclined oblique groove 12A.

As to the junctions of the oblique grooves 12B and the oblique groove 12A: the junction of the first oblique groove 12B is positioned at the axially inner end 12Ai in the axially inner part A1; the junction of the second oblique groove 12B is positioned in the middle part A2 immediately axially outside the border between the middle part A2 and inner part A1; the junction of the third oblique groove 12B is also positioned in the middle part A2; and the intersection between the fourth oblique groove 12B and the oblique groove 12A is positioned near the axially outer end 12Ao.

The above-mentioned oblique grooves 12A and 12B form a unidirectional tread pattern. The designed rotational direction thereof is indicated in FIG. 2 by an arrow R. Rotating in this direction, the oblique grooves 12A and 12B first contact with the ground at the axially inner end. In other words, the oblique grooves 12A and 12B are so inclined towards one circumferential direction.

Apart from the above-explained oblique grooves, various configurations can be used.

Comparison Tests

Test tires of size 225/50R16 having the same internal structure shown in FIG. 1 and the tread pattern shown in FIG. 2 or similar pattern were made and tested for pass-by noise, pitch noise, steering stability, wet performance, wear resistance, and high-speed durability. The specifications of the test tires and test results are given in Table 1.

Pass-by Noise Test: According to JASO C-606, a test car (3000 cc FR passenger car) provided on all the wheels with test tires was coasted on a smooth asphalt road at a speed of 53 km/h for a distance of 50 meters, and in the middle of the course, the maximum level in dB(A) of the pass-by noise was measured with a microphone fixed at a position 7.5 meter sideways from the center line of the running course and 1.2 meter height from the road surface. The tires were mounted on a standard rim of size 8JJX16 and inflated to an inner pressure of 200 kPa.

Pitch Noise Test: The above-mentioned test car was coasted at a speed of 120 km/h and the pitch noise was evaluated into five ranks by the test driver's feelings.

Steering Stability Test: During running the test car on a dry asphalt road and wet asphalt road in a tire test course, steering stability was evaluated into five ranks by the test driver's feelings.

Wet performance Test: The test car was run on a loom radius asphalt course provided with a 5 mm depth 20 m length water pool, and changing the entering speed, the lateral acceleration (lateral G) was measured on the front wheels to obtain the average lateral G from 50 to 80 km/h. The results are put into five ranks.

Wear resistance Test: The test car was run for 8000 km, and then the tread portion was checked for uneven wear to evaluate into five ranks.

High-speed durability Test: The test was conducted according to the load/speed performance test, ECE30, condition W. The results are evaluated into five ranks.

The results of the above-mentioned tests are shown in Table 1. In the ranking, the larger the number, the better the performance.

It was confirmed from the test results that, in the Example tires according to the present invention, the steering stability and wet performance can be improved without sacrificing the tire noise, wear resistance and high-speed durability.

What is claimed is:

1. A pneumatic tire comprising
    a circumferentially continuously extending wide groove having a width of from 35 to 45 mm disposed in a tread center,
    a part on each side of the wide groove, which is defined as extending at least 10 mm axially outwards from the groove edge, being formed as a substantially continuous rib part,
    a part between the rib part and a tread edge, being provided with circumferentially discontinuous grooves so that: an axially inner part has a land ratio La of not less than 90%; a middle part has a land ratio Lb in a range of from 80 to 90%; and an axially outer part has a land ratio Lc in a range of from 85 to 95%, wherein the axially inner part, middle part and axially outer part are three equiwidth parts between the wide groove and the tread edge.

2. The pneumatic tire as set forth in claim 1, wherein the land ratios La, Lb and Lc satisfy La>Lb and Lc>Lb.

3. The pneumatic tire as set forth in claim 2, wherein said circumferentially discontinuous grooves include less-inclined oblique grooves inclined at an angle of not more than 30 degrees with respect to the circumferential direction of the tire, axial inner ends of said less-inclined oblique grooves are positioned on the same side in the tire circumferential direction, and each said less-inclined oblique groove extends across the substantially entire width of the middle part.

4. The pneumatic tire as set forth in claim 1, wherein the land ratios La, Lb and Lc satisfy La>Lc>Lb.

5. The pneumatic tire as set forth in claim 1, wherein said circumferentially discontinuous grooves include less-inclined oblique grooves inclined at an angle of not more than 30 degrees with respect to the circumferential direction of the tire, axial inner ends of said less-inclined oblique grooves are positioned on the same side in the tire circumferential direction, and each said less-inclined oblique groove extends across the substantially entire width of the middle part.

TABLE 1

| Tire | Ex. 1 | Ref. 1 | Ref. 2 | Ref. 3 | Ref. 4 | Ref. 5 | Ref. 6 | Ex.2 | Ref. 7 |
|---|---|---|---|---|---|---|---|---|---|
| Wide groove | | | | | | | | | |
| Width GW (mm) | 40 | 30 | 40 | 48 | 40 | 40 | 40 | 40 | 40 |
| Depth (mm) | 8.2 | 8.2 | 8.2 | 8.2 | 8.2 | 8.2 | 8.2 | 8.2 | 8.2 |
| Land ratio | | | | | | | | | |
| La (%) | 95 | 95 | 88 | 92 | 95 | 95 | 95 | 92 | 95 |
| Lb (%) | 82 | 82 | 82 | 82 | 92 | 73 | 73 | 82 | 82 |
| Lc (%) | 86 | 86 | 86 | 86 | 86 | 86 | 78 | 95 | 86 |
| Rib part Width W (mm) | 16 | 16 | 16 | 16 | 16 | 16 | 16 | 16 | 8 |
| Test results | | | | | | | | | |
| Steering stability | 4.5 | 4 | 2 | 2 | 4 | 3 | 2.5 | 4.5 | 1.5 |
| Wet performance | 4.5 | 3 | 4 | 4 | 3 | 4 | 4.5 | 3.5 | 4.5 |
| Pass-by noise (dB) | 68.3 | 74 | 68.7 | 67.6 | 68.1 | 69.4 | 70.3 | 68.1 | 68.8 |
| Pitch noise | 4 | 4 | 4 | 4 | 4 | 3 | 3 | 4 | 3 |
| Wear resistance | 4 | 4 | 4 | 4 | 4 | 4 | 2 | 4.5 | 3.5 |
| High-speed durability | 4 | 4 | 4 | 4 | 1 | 4 | 3 | 3.5 | 4 |

6. The pneumatic tire as set forth in claim 5, wherein both end portions of each said oblique groove are inclined at an angle of less than 10 degrees with respect to the circumferential direction of the tire.

7. The pneumatic tire as set forth in claim 6, wherein said circumferentially discontinuous grooves include more-inclined oblique grooves inclined at an angle of more than 30 degrees with respect to the circumferential direction of the tire, and each said less-inclined oblique groove joins a certain number of more-inclined oblique grooves.

8. The pneumatic tire as set forth in claim 6, wherein said circumferentially discontinuous grooves include more-inclined oblique grooves starting from the less-inclined oblique grooves and extending axially outwardly to the tread edge at an inclination angle of more than 30 degrees with respect to the circumferential direction of the tire.

9. The pneumatic tire as set forth in claim 5, wherein said circumferentially discontinuous grooves include more-inclined oblique grooves inclined at an angle of more than 30 degrees with respect to the circumferential direction of the tire, and each said less-inclined oblique groove joins a certain number of more-inclined oblique grooves.

10. The pneumatic tire as set forth in claim 5, wherein said circumferentially discontinuous grooves include more-inclined oblique grooves starting from the less-inclined oblique grooves and extending axially outwardly to the tread edge at an inclination angle of more than 30 degrees with respect to the circumferential direction of the tire.

11. The pneumatic tire as set forth in claim 10, wherein the axially inner end of each said less-inclined oblique groove is positioned in the axially inner part.

\* \* \* \* \*